United States Patent [19]

Hasegawa et al.

[11] 4,381,698
[45] May 3, 1983

[54] CHANGEOVER VALVE UNIT FOR POWER-ASSISTED STEERING SYSTEMS

[75] Inventors: Akira Hasegawa; Yoshimi Sato, both of Susono; Masahisa Ando, Aichi; Nobuo Hiraiwa, Toyota, all of Japan

[73] Assignee: Toyota Jidosha Kogyo Kabushiki Kaisha, Aichi, Japan

[21] Appl. No.: 217,171

[22] Filed: Dec. 16, 1980

[30] Foreign Application Priority Data

Dec. 28, 1979 [JP] Japan .................... 54-170605

[51] Int. Cl.³ .............................. F15B 9/10
[52] U.S. Cl. .................................. 91/382
[58] Field of Search ............. 91/368, 375 A, 382

[56] References Cited

U.S. PATENT DOCUMENTS 2,773,396 12/1956 Haynes et al. .................. 74/388
3,733,967 5/1973 Duffy ............................ 91/382 X

FOREIGN PATENT DOCUMENTS 1270400 4/1972 United Kingdom .

Primary Examiner—Robert G. Nilson
Attorney, Agent, or Firm—Parkhurst & Oliff

[57] ABSTRACT

A changeover valve unit for a power-assisted steering system includes input and output shafts arranged for relative rotation on aligned axes, a spool valve element concentrically assembled with the input shaft to be axially shifted in response to relative rotation of the shafts, and a sleeve-like valve casing surrounding the spool valve element to cooperate with the spool valve element for controlling the supply of fluid under pressure to a hydraulic cylinder associated with the steering system. A thrust plate is rotatably coupled at its inner periphery with the output shaft and secured at its outer periphery to the valve casing thereby to prevent rotation of the valve casing and to permit axial movement of the valve casing caused by displacement of the output shaft.

4 Claims, 5 Drawing Figures

CHANGEOVER VALVE UNIT FOR POWER-ASSISTED STEERING SYSTEMS

BACKGROUND OF THE INVENTION

The present invention relates to power-assisted steering systems for wheeled vehicles, and more particularly to a changeover valve unit for controlling the supply of fluid under pressure to a hydraulic cylinder associated with the steering system.

In general, such a conventional changeover valve unit as described above comprises input and output shafts arranged for relative rotation on aligned axes, and a spool valve element concentrically assembled with the input shaft to be shifted in response to relative rotation of the shafts in an axial direction to control the supply of fluid under pressure to the hydraulic cylinder. In use of the steering system, if defacement of the bearings for the output shaft results in an intervening space, the operator's effort in steering the steering road wheels to the right will differ from that in steering the steering road wheels to the left. For the purpose of eliminating such a defect, the output shaft is integrally provided with a sleeve-like valve casing which surrounds the spool valve element to provide reliable control of the fluid flow. It has been, however, experienced that the valve casing and the output shaft rotate jointly to cause large frictional resistance at outer peripheral sealing portions of the valve casing. As a result of the frictional resistance acting on the output shaft, smooth return operation of the steering wheel may not be expected, and the power-assisted steering operation will suffer.

SUMMARY OF THE INVENTION

It is, therefore, a primary object of the present invention to provide an improved changeover valve unit for a power-assisted steering system capable of ensuring smooth return operation of the steering wheel and eliminating any difference between the operator's efforts in steering the road wheels to the right and the left even if the bearings for the output shaft are defaced.

According to the present invention there is provided a changeover valve unit for a power-assisted steering system including a driven member for operative connection with the steering road wheels of a wheeled vehicle and being arranged to a be power-assisted by a hydraulic cylinder. The changeover valve unit comprises a valve housing provided with an inlet port for connection to a source of fluid pressure, a pair of outlet ports for connection to the hydraulic cylinder, and a drain port for connection to a fluid reservoir, input and output shafts arranged for relative rotation on aligned axes within the valve housing, the output shaft being operatively connected to the driven member, a resilient member in the form of a torsion bar interconnecting the input and output shafts to permit relative rotation of the shafts, a spool valve element arranged to be shifted in response to relative rotation of the shafts in an axial direction, a sleeve-like valve casing in surrounding relationship with the spool valve element within the valve housing and cooperating with the spool valve element to control the flow of fluid among the ports, means for conducting axial movement of the spool valve element in response to relative rotation of the shafts, and a thrust plate rotatably coupled at its inner periphery with the output shaft to freely permit rotation of the output shaft relative to the valve casing and to permit axial movement of the valve casing caused by axial displacement of the output shaft.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
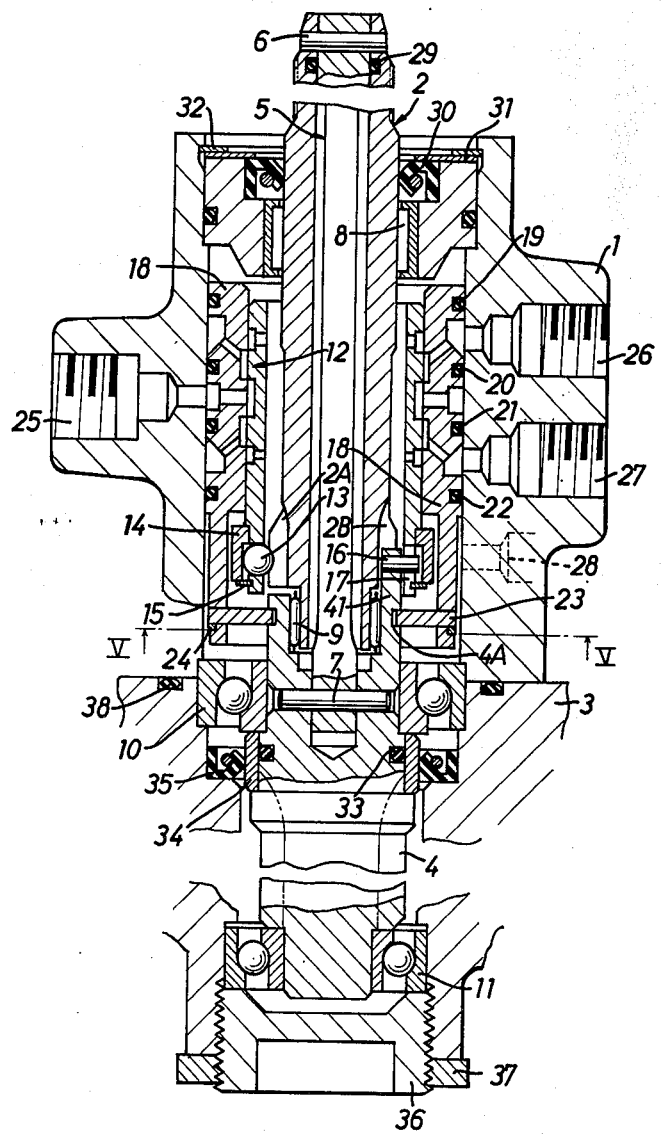
FIG. 1 illustrates a sectional elevation of a changeover valve unit for a power-assisted steering system in accordance with the present invention.

With reference to the drawings, FIG. 1 illustrates a changeover valve unit for a power-assisted steering system in accordance with the present invention which includes an input shaft 2 in the form of a hollow shaft extending into a valve housing 1, and an output shaft 4 journalled within a gear housing 3 and extending into the valve housing 1 coaxially with the input shaft 2. The valve housing 1 is fitted to the gear housing 3 via an O-ring 38 in a fluid-tight manner. The input and output shafts 2 and 4 are arranged for relative rotation and connected to each other by means of a torsion bar 5, one end of which is pinned at 6 to the input shaft 2 and the other end of which is pinned at 7 to the output shaft 4. Thus, the torsion bar 5 acts to transmit a torque applied to the input shaft 2 to the output shaft 4 and strains to permit relative rotation between the input and output shafts 2 and 4. In addition, the input shaft 2 is rotatably supported by a pair of needle-bearings 8 and 9 which are respectively carried on the valve housing 1 and within the upper end of output shaft 4. The output shaft 4 is rotatably supported by a pair of ball bearings 10 and 11 which are carried on the gear housing 3.

A spool valve element 12 is in surrounding relationship with the input shaft 2 such as to be axially moved in response to rotation of the input shaft 2, as described hereinafter. The input shaft 2 is formed at its lower end portion with a pair of helical follower grooves 2A which receive a pair of steel balls 13 therein. (In the figure, only one of the grooves 2A and balls 13 is illustrated.) The steel balls 13 are rotatably contained within each radial bore in the lower end portion of the spool valve element 12. A retainer collar 14 is fixed by a retaining ring 15 in place on the lower end of the spool valve element 12 to retain the steel balls 13 therein. The spool valve element 12 is further provided at the lower end portion thereof with a pair of axial slots 17 one of which is shown in the figure. The output shaft 4 is integrally formed at its upper end with a pair of axial projections 41 which are contained within the corresponding axial recesses 2B in the lower end portion of input shaft 2, there being a circumferential clearance between each of the axial projections 41 and each of the axial recesses 2B to permit relative rotation between the input and output shafts 2 and 4. A lateral pin 16 is fixed to each of the axial projections 41 of output shaft 4 and engages with each of the axial slots 17 of spool valve element 12 for preventing rotation of the spool valve element 12 relative to the output shaft 4.

With this spool valve assembly, the application of a torque to the input shaft 2 will tend to rotate the input shaft 2 relative to the output shaft 4 due to distortion of the torsion bar 5. In this relative rotation of input and output shafts 2 and 4, the steel balls 13 will roll along each helical groove 2A of the input shaft 2 to cause axial movement of the spool valve element 12, and the lateral pins 16 act to prevent rotation of the spool valve element 12 relative to the output shaft 4.

Figure 2:
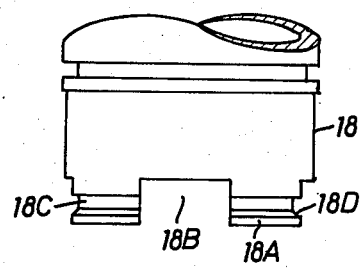
FIG. 2 illustrates an elevation of a portion of a sleeve-like valve casing shown in FIG. 1.
Figure 3:
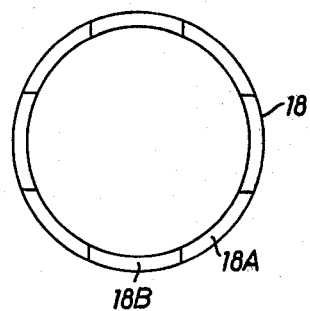
FIG. 3 is a plan view of the sleeve-like valve casing.

A sleeve-like valve casing 18 surrounds the spool valve element 12 within the valve housing 1 and is formed with fluid passages which cooperate with fluid passages of the spool valve element 12 to control fluid flow from an inlet port 25 into one of the outlet ports 26 and 27 and from the other outlet port to a drain port 28. The valve casing 18 is also provided at its outer periphery with annular oil-seal members 19, 20, 21, 22 at opposite sides of each of the fluid passages and provided at its lower end with equidistantly spaced axial projections 18A and recesses 18B, as can be well seen in FIGS. 2 and 3. The respective axial projections 18A of valve casing 18 are provided at their outer peripheries with circumferential grooves 18C which are formed at one side thereof with a tapered surface 18D.

Figure 4:
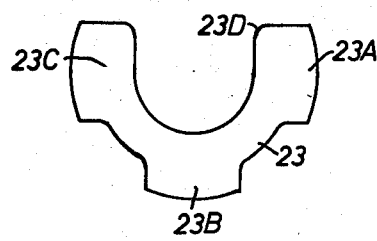
FIG. 4 is a plan view of a thrust plate assembled within the changeover valve unit of FIG. 1.
Figure 5:
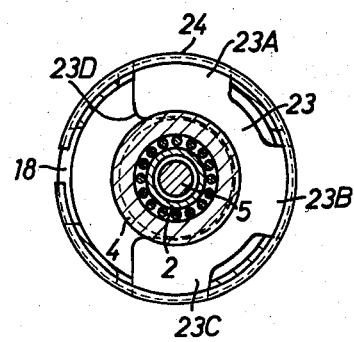
FIG. 5 is a cross-sectional view taken along the plane of line V—V in FIG. 1.

As shown in FIG. 1, the valve casing 18 is connected at its lower end with the upper end of output shaft 4 by means of a thrust plate 23 in the form of a C-shaped plate. The thrust plate 23 is formed with three radial lugs 23A, 23B, 23C, as shown in FIG. 4, which are coupled with three selected recesses 18B of valve casing 18 and fixed in place by means of a retaining ring 24 coupled with the circumferential grooves 18C of valve casing 18, as shown in FIG. 5. With this assembly, even if there is any axial intervening space between the valve casing 18 and the thrust plate 23, the retaining ring 24 acts as a wedge element due to resilient engagement against the tapered surfaces 18D of the circumferential grooves 18C to reliably secure the thrust plate 23 in place without any intervening space in an axial direction.

The thrust plate 23 is formed with an inner peripheral rim 23D which is rotatably coupled with an annular groove 4A of the output shaft 4. This serves to freely permit rotation of the output shaft 4 relative to the valve casing 18 and to prevent rotation of the valve casing 18 from being caused by rotation of the output shaft 4. In case defacement of the ball bearings 10 and 11 for the output shaft 4 results in an axial intervening space, the thrust plate 23 serves to jointly move the valve casing 18 with the output shaft 4 in the axial direction thereby to eliminate defects caused by such intervening space in the bearings 10 and 11 as described above.

In the illustrated embodiment, the inlet port 25 of valve housing 1 is connected to a source of fluid pressure in the form of a hydraulic pump (not shown), the outlet ports 26 and 27 are connected to the right and left fluid chambers of a hydraulic cylinder (not shown) respectively, and the drain port 28 is connected to a fluid reservoir (not shown). The output shaft is integrally formed with a pinion which is meshed in a conventional manner with a rack member for operative connection with the steering road wheels of the vehicle. The rack member is actuated by the hydraulic cylinder. Additionally, the reference numeral 29 denotes an O-ring interposed between the input shaft 2 and the torsion bar 5, the reference numeral 30 denotes an oil-seal member fixed in place within the valve housing 1 by means of a retaining ring 32 through an annular plate 31, and the reference numeral 33 denotes an O-ring attached to the output shaft 4 and retained in place by an annular distance piece 34. An oil-seal member 35 surrounds the distance piece 34 within the valve housing 1, and a clamping bolt 36 is threaded into the gear housing 3 and fastened in place by a lock nut 37.

Hereinafter, the operation of the changeover valve unit will be described in detail. When the operator applies a torque to the steering wheel in one sense, the torque is applied to the input shaft 2 and transmitted to the output shaft 4 through the torsion bar 5. Correspondingly, the steel balls 13 roll along the helical grooves 2A in response to relative rotation between the input and output shafts 2 and 4 to conduct axial movement of the spool valve element 12. The axial movement of the spool valve element 12 is guided by slidable engagement with the lateral pins 16 fixed to the output shaft 4. Thus, the spool valve element 12 cooperates with the valve casing 18 to control the flow of fluid under pressure from the inlet port 25 to one of the outlet ports 26 and 27.

For instance, when the operator's effort is applied to the steering wheel to steer the road wheels to the right, the spool valve element 12 moves upwards to permit the flow of fluid from the inlet port 25 to the outlet port 26. When the operator's effort is applied to the steering wheel to steer the steering road wheels to the left, the spool valve element 12 moves downwards to permit the flow of fluid from the inlet port 25 to the outlet port 27. In the absence of a torque being applied to the input shaft 2, the spool valve element 12 is in a neutral position in which the fluid under pressure from inlet port 25 flows into the drain port 28 across the spool valve assembly and returns into the fluid reservoir.

During the axial movement of the spool valve element 12 described above, rotation of the valve casing 18 is reliably prevented due to rotatable coupling of the inner peripheral rim 23D of thrust plate 23 with the annular groove 4A of output shaft 4 and frictional engagement of oil seal members 19, 20, 21, 22 of valve casing 18 with the inner peripheral wall of valve housing 1, in spite of rotation of the output shaft 4. In case the output shaft 4 is displaced upwards or downwards due to defacement of the ball bearings 10 and 11, the thrust plate 23 acts to jointly move the valve casing 18 with the output shaft 4 in the axial direction so as to eliminate defects caused by the defacement of the ball bearings 10 and 11 heretofore. It is, therefore, noted that when the spool valve element 12 is in the neutral position without any distortion of the torsion bar 5, any relative displacement does not occur between the spool valve element 12 and the valve casing 18 and that the operator's efforts in steering the steering road wheels to the right and the left are equally applied to the steering wheel without any difference. It is further noted that slippage does not occur between the inner peripheral wall of valve housing 1 and the oil-seal members 19, 20, 21, 22 of valve casing 18. Consequently, the thrust plate serves to ensure smooth return operation of the steering wheel without any suffering caused by frictional resistance of the oil-seal members 19, 20, 21, and 22.

Although a specific embodiment of the present invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A changeover valve unit for a power-assisted steering system including a driven member for operative connection with the steering road wheels of a wheeled vehicle and arranged to be power-assisted by a hydraulic cylinder, said changeover valve unit comprising:

a valve housing provided with an inlet port for connection to a source of fluid pressure, outlet ports for connection to said hydraulic cylinder, and a drain port for connection to a fluid reservoir;

input and output shafts arranged for relative rotation on aligned axes within said valve housing, said output shaft being operatively connected to said driven member;

a resilient member interconnecting said input and output shafts for permitting relative rotation of said shafts;

a spool valve element arranged to be moved in response to relative rotation of said shafts in an axial direction;

a valve casing in surrounding relationship with said spool valve element within said valve housing and cooperating with said spool valve element for controlling the flow of fluid among said ports; and means for conducting axial movement of said spool valve element in response to relative rotation of said shafts;

the improvement wherein a thrust plate is rotatably coupled at its inner periphery with said output shaft to freely permit rotation of said output shaft relative to said valve casing and is secured at its outer periphery to said valve casing, to permit axial movement of said valve casing in said valve housing caused by axial displacement of said output shaft.

2. A changeover valve unit for a power-assisted steering system including a driven member for operative connection with the steering road wheels of a wheeled vehicle and arranged to be power-assisted by a hydraulic cylinder, said changeover valve unit comprising:

a valve housing provided with an inlet port for connection to a source of fluid pressure, outlet ports for connection to said hydraulic cylinder, and a drain port for connection to a fluid reservoir;

input and output shafts arranged for relative rotation on aligned axes within said valve housing, said output shaft being operatively connected to said driven member;

a resilient member interconnecting said input and output shafts for permitting relative rotation of said shafts;

a spool valve element arranged to be moved in response to relative rotation of said shafts in an axial direction;

a valve casing in surrounding relationship with said spool element within said valve housing and cooperating with said spool valve element for controlling the flow of fluid among said ports; and means for conducting axial movement of said spool valve element in response to relative rotation of said shafts;

the improvement wherein a thrust plate is rotatably coupled at its inner periphery with said output shaft to freely permit rotation of said output shaft relative to said valve casing and to permit axial movement of said valve casing in said valve housing caused by axial displacement of said output shaft, said thrust plate being formed with an inner peripheral rim rotatably coupled within an annular groove of said output shaft and with a plurality of radial lugs fixedly engaged with one end of said valve casing.

3. A changeover valve unit as claimed in claim 2, wherein said valve casing is formed at the one end thereof with a plurality of equidistantly spaced axial projections and recesses, said axial projections being provided at their outer peripheries with circumferential grooves, and wherein said radial lugs of said thrust plate are engaged with said axial recesses of said valve casing and fixed in place by means of a retaining ring coupled within the grooves of said projections.

4. A changeover valve unit as claimed in claim 3, wherein the grooves of said projections of said valve casing are formed at one side thereof with a tapered surface to which said retaining ring is resiliently urged to secure said thrust plate in place.

* * * * *